United States Patent [19]

Gotou et al.

[11] Patent Number: 4,847,616

[45] Date of Patent: Jul. 11, 1989

[54] MODE SELECTION CIRCUIT

[75] Inventors: Yutaka Gotou; Kiyotaka Matsubara, both of Tokyo, Japan

[73] Assignee: NEC Corporation, Tokyo, Japan

[21] Appl. No.: 235,627

[22] Filed: Aug. 24, 1988

[30] Foreign Application Priority Data

Aug. 27, 1987 [JP] Japan ............................ 62-211259

[51] Int. Cl.[4] ............................ H04Q 1/00

[52] U.S. Cl. ............................ 340/825; 340/825.06

[58] Field of Search ............................ 368/69, 70, 224; 307/542.1; 340/825, 825.06; 364/705, 709

[56] References Cited

U.S. PATENT DOCUMENTS

| | | | |
|---|---|---|---|
| 3,823,550 | 7/1974 | Bergey | 368/69 |
| 4,028,878 | 6/1977 | Droz et al. | 307/542.1 X |
| 4,030,284 | 6/1977 | Portmann | 307/542.1 X |
| 4,198,579 | 4/1980 | Ebihara et al. | 307/542.1 |
| 4,349,076 | 9/1982 | Oldendorf et al. | 307/542.1 X |
| 4,376,993 | 3/1983 | Freeman | 368/69 |
| 4,417,155 | 11/1983 | Aizawa | 307/542.1 |

*Primary Examiner*—Ulysses Weldon

*Attorney, Agent, or Firm*—Foley & Lardner, Schwartz, Jeffery, Schwaab, Mack

[57] ABSTRACT

A mode selection circuit for supplying a mode selection signal and a reset signal to an apparatus having a plurality of operating modes each time an operating mode is selected includes a mode switch to which the operating mode is manually set, a mode register for outputting data representing the operating mode designated by a software command, a first AND gate for receiving outputs from the mode switch and the mode register and supplying an output to the apparatus as the mode selection signal, a first reset signal generator for generating a first reset signal in accordance with one of a power switch and a reset switch, a second reset signal generator for generating a second reset signal designated by the software command, and a second AND gate for selecting one of the first and second reset signals and outputting the selected signal to the apparatus as the reset signal.

3 Claims, 3 Drawing Sheets

MODE SELECTION CIRCUIT

BACKGROUND OF THE INVENTION

The present invention relates to a mode selection circuit for selecting an operating mode of an apparatus having a plurality of operating modes.

FIG. 1 shows a typical configuration of a conventional operating mode selection circuit of an apparatus having a plurality of operating modes, and FIG. 2 is a flow chart for explaining a test operation of the apparatus shown in FIG. 1.

In FIGS. 1 and 2, an operating mode selection signal MODESEL for determining an operating mode of an apparatus 100 is generated by setting with a mode switch 1 and directly input to the apparatus 100. When a power switch 2 is turned on or a reset switch 3 is pressed, a reset signal generator 4 generates and supplies a reset signal RESET to the apparatus 100. As a result, the apparatus 100 is operated in an operating mode represented by the operating mode selection signal MODESEL (FIG. 2, step 21). Then, the apparatus 100 is tested (step 22). A result of the test is checked in step 23. If NO in step 23, the flow advances to step 24 to repair the apparatus and returns to step 21 after repair. If YES in step 23, the flow advances to step 25 to check whether the test of all modes has been completed. If NO in step 25, the flow advances to step 26 to set the mode switch 1 to the next mode and press the reset switch 3.

As described above, in order to test all the modes of the apparatus, the mode switch 1 and the reset switch 3 must be manually set and pressed, respectively, before the test of each mode, resulting in a troublesome operation.

SUMMARY OF THE INVENTION

It is, therefore, a principal object of the present invention to provide a mode selection circuit which can eliminate the above conventional drawback and can perform operating mode selection without a manual operation.

According to the present invention, there is provided a mode selection circuit for supplying a mode selection signal and a reset signal to an apparatus having a plurality of operating modes each time an operating mode is selected, comprising a mode switch to which the operating mode is manually set, a power switch and a reset switch to be manually set, reset signal generating means for generating a first reset signal in accordance with one of the power switch and the reset switch, mode register means for outputting a signal representing a desired operating mode in accordance with a command signal, pseudo reset signal generating means for generating a second reset signal in accordance with the command signal, means for selecting and outputting one of outputs from the mode switch and the mode register means to the apparatus as the mode selection signal, and means for selecting and outputting one of the first and second reset signals from the reset signal generating means and the pseudo signal generating means to the apparatus as the reset signal.

DETAILED DESCRIPTION OF THE PREFERRED EMBODIMENT

An embodiment of the present invention will be described in detail below with reference to the accompanying drawings.

Figure 1:
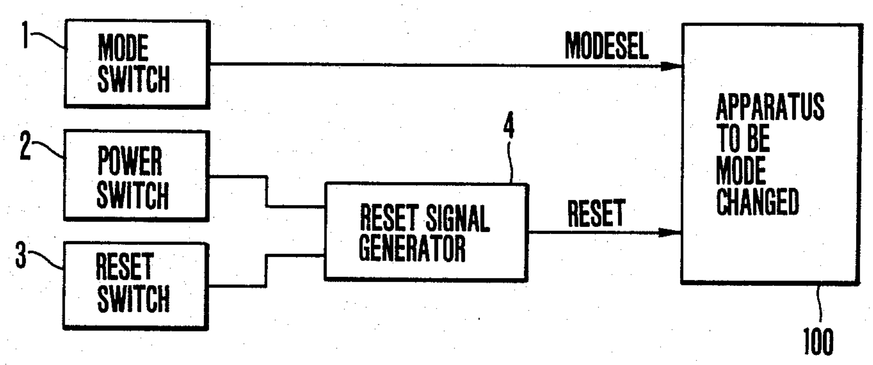
FIG. 1 (PRIOR ART)
FIG. 1 is a block diagram showing a configuration of a conventional mode selection circuit.
Figure 3:
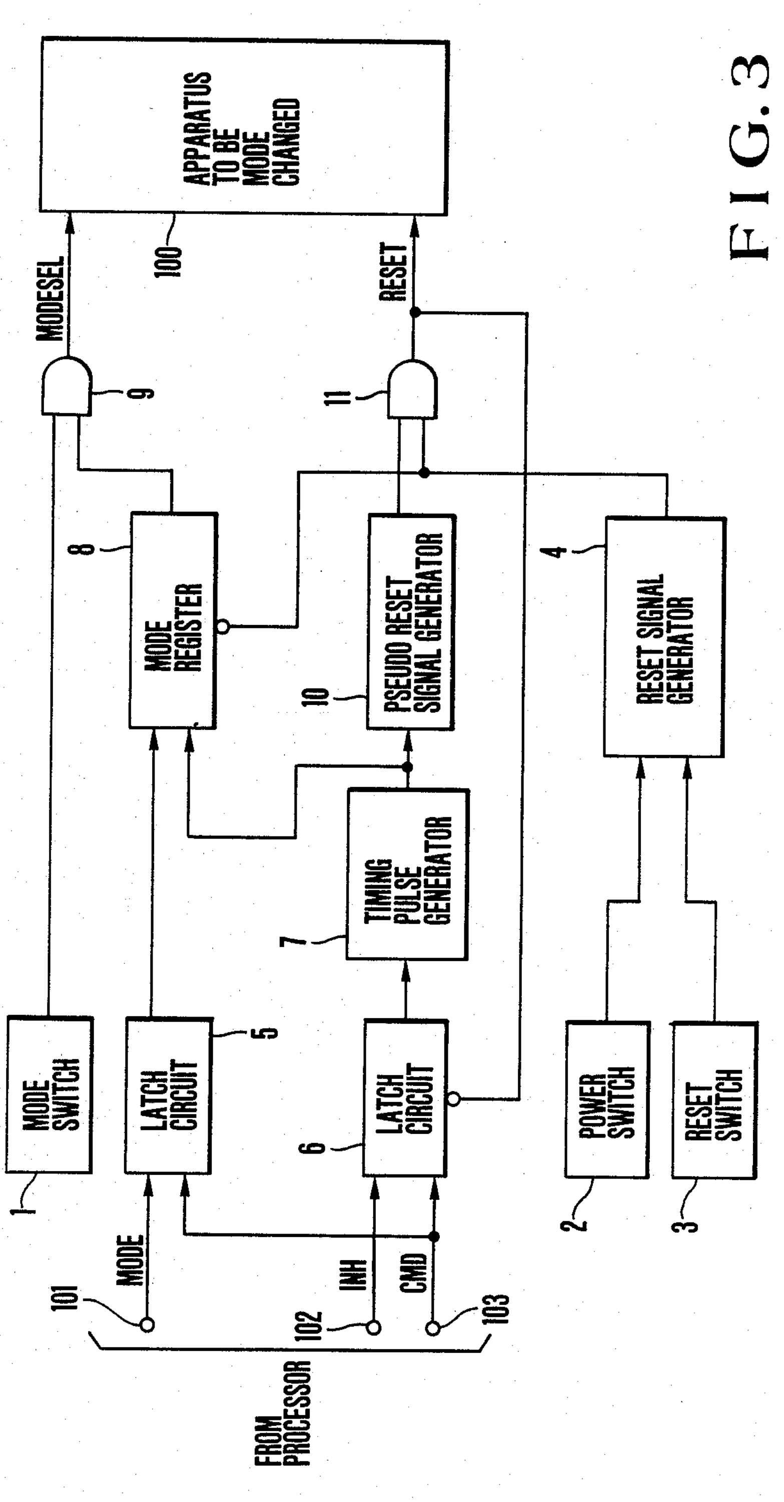
FIG. 3 is a block diagram showing a configuration of an embodiment of the present invention.

FIG. 3 is a block diagram showing a configuration of mode selection circuit according to an embodiment of the present invention. The same reference numerals in FIG. 3 denote the same or corresponding parts as in FIG. 1.

In FIG. 3, a mode switch 1 capable of selecting two operating modes of an apparatus 100 is connected to one input terminal of an AND gate 9 for outputting a mode selection signal MODESEL to the apparatus 100.

The other input terminal of the AND gate 9 is connected to the output terminal of a mode register 8. The output terminal of the AND gate 9 is connected to the apparatus 100 and outputs the mode selection signal MODESEL thereto.

A power switch 2 and a reset switch 3 are connected to a reset signal generator 4. An output signal from the reset signal generator 4 is supplied to one input terminal of an AND gate 11 and to the mode register 8 as a control signal.

The other input terminal of the AND gate 11 is connected to the output terminal of a pseudo reset signal generator 10. The AND gate 11 outputs a reset signal RESET to the apparatus 100.

A processor (not shown) supplies a signal MODE which represents a mode to be set in the apparatus 100 to a terminal 101, a signal INH which represents allowance of operating mode selection by "1" and inhibition thereof by "0" to a terminal 102, and a command signal CMD for commanding execution of mode selection to a terminal 103.

A latch circuit 5 latches the mode signal MODE supplied from the terminal 101 in accordance with the command signal CMD. A latch circuit 6 latches the signal INH supplied from the terminal 102 in accordance with the command signal CMD. The latch circuit 6 is reset by the reset signal RESET output from the AND gate 11.

An output from the latch circuit 6 is supplied to a timing pulse generator 7. When the output from the latch circuit 6 is "1", the timing pulse generator 7 generates and supplies a timing pulse to the mode register 8 and the pseudo reset signal generator 10.

Output data from the latch circuit 5 is loaded on the mode register 8 in accordance with the timing pulse from the timing pulse generator 7.

The pseudo reset signal generator 10 generates and outputs a pseudo reset signal similar to the reset signal RESET to the other input terminal of the AND gate 11 in accordance with the timing signal from the timing pulse generator 7.

An operation of the circuit shown in FIG. 3 will be described below. Assume that the mode selection signal MODESEL represents two modes by "1" and "0", and the reset signal RESET is active when it is "0".

When the power switch 2 is turned on to activate a power source or the reset switch 3 is pressed, a reset signal of "0" output from the reset signal generator 4 sets the mode register 8 to "1" and is supplied as the reset signal RESET to the apparatus 100 through the AND gate 11. The reset signal RESET output from the AND gate 11 resets the latch circuit 6 to "0". Since an output from the mode register 8 is "1", a set value of the mode switch 1 is directly supplied as the operating mode selection signal MODESEL to the apparatus 100 through the AND gate 9. Therefore, mode selection can be manually performed.

However, when "1" is set in the mode switch 1 to initialize the apparatus 100, a value of the mode register 8 is directly supplied as the operating mode selection signal MODESEL to the apparatus through the AND gate 9. Therefore, an operating mode can be selected by software.

That is, when the mode switch 1 is "1", the latch circuits 5 and 6 latch the data MODE and INH supplied from the processor to the terminals 101 and 102, respectively, in accordance with the command signal CMD. When the data INH latched by the latch circuit 6 is "1", i.e., when mode selection is allowed, the timing pulse generator 7 outputs and supplies a timing pulse to the mode register 8 and the pseudo reset signal generator 10. As a result, the data MODE latched by the latch circuit 5 is loaded in the mode register 8 and output as the operating mode selection signal MODESEL to the apparatus 100 through the AND gate 9. At the same time, the pseudo reset signal generator 10 generates a pseudo reset signal. The pseudo reset signal is output as the reset signal RESET to the apparatus 100 through the AND gate 11. Therefore, the apparatus 100 is operated in the operating mode set in the mode register 8. The latch circuit 6 is reset to "0" by the reset signal RESET and, therefore, is enabled to receive the command signal CMD for commanding operating mode selection.

Figure 2:
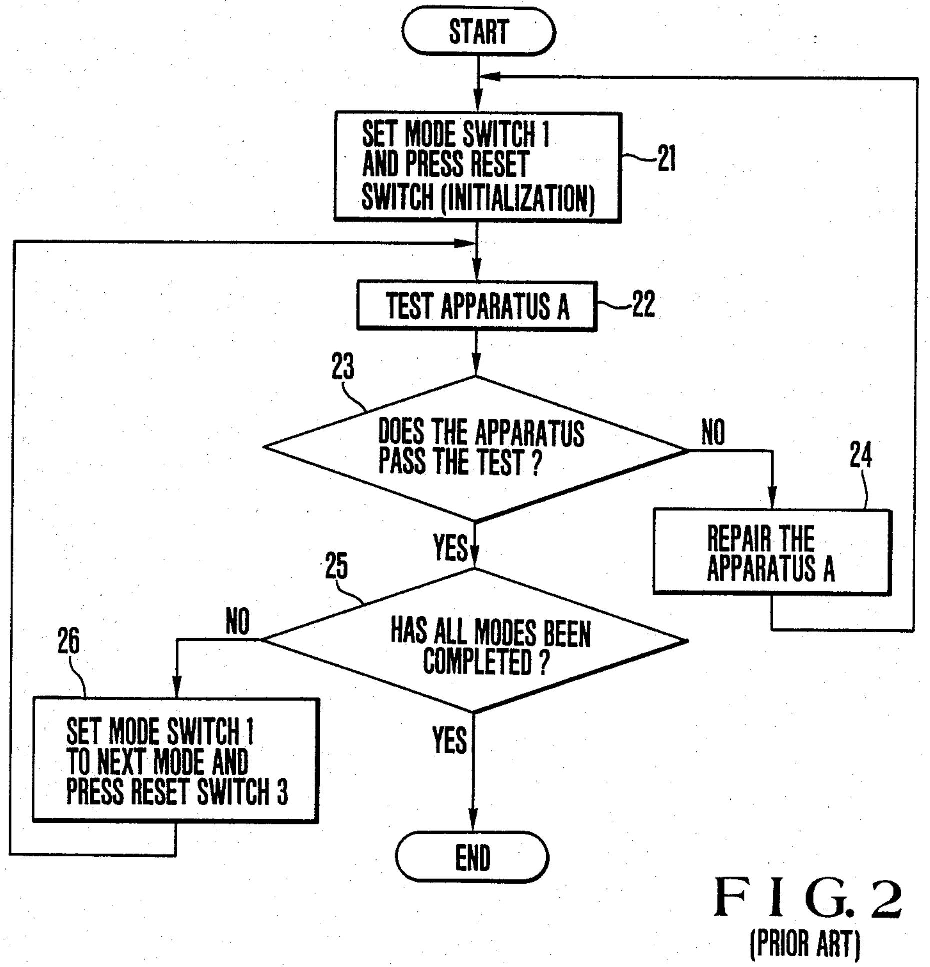
FIG. 2 (PRIOR ART)
FIG. 2 is a flow chart for explaining a test operation of the apparatus shown in FIG. 1.
Figure 4:
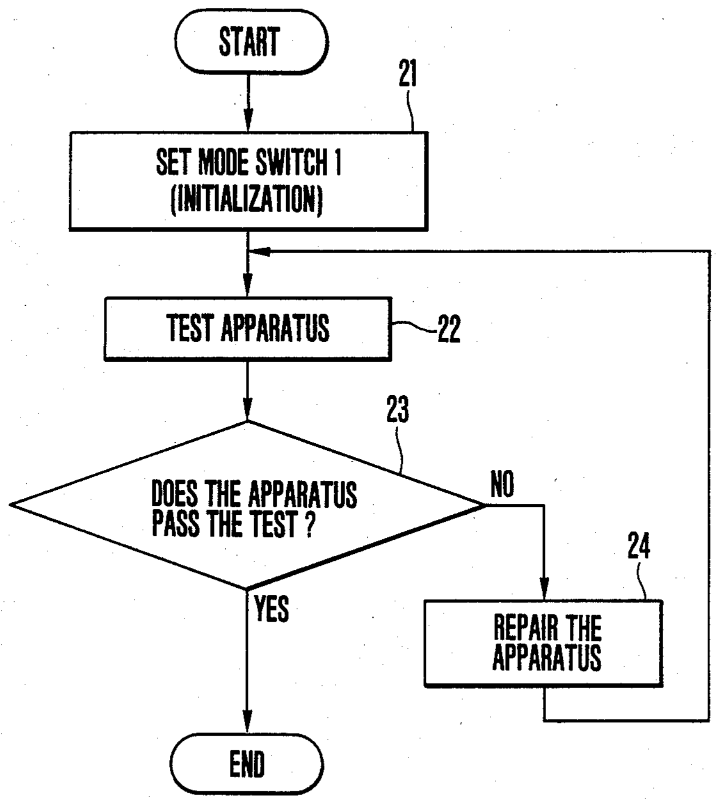
FIG. 4 is a flow chart for explaining a test operation of the apparatus shown in FIG. 3.

FIG. 4 is a flow chart for explaining a test of the apparatus 100 according to the circuit shown in FIG. 3. As shown in FIG. 4, steps 25 and 26 in FIG. 2 are omitted to simplify the operation. That is, the test is performed in accordance with a software command after initialization for setting the mode switch 1 to "1" without a manual operation.

As has been described above, the present invention includes the mode register which is set in accordance with a software command and the pseudo reset signal generator for generating a pseudo reset signal, in addition to the conventional mode switch, power switch, reset switch, and reset signal generator. Therefore, an operating mode can be selected by software without a manual operation. As a result, all operating modes can be effectively tested without a manual operation after the apparatus is initialized once. In addition, if the apparatus is a mass-produced one having a large number of operating modes, the number of test steps can be effectively reduced to simplify the test.

What is claimed is:

1. A mode selection circuit for supplying a mode selection signal and a reset signal to an apparatus having a plurality of operating modes each time an operating mode is selected, said mode selection circuit comprising:

a mode switch to which said operating mode is manually set;

a power switch and a reset switch, both to be manually set;

reset signal generating means for generating a first reset signal in accordance with one of said power switch and said reset switch;

mode register means for outputting a signal representing a desired operating mode in accordance with a command signal;

pseudo reset signal generating means for generating a second reset signal in accordance with said command signal;

first gate means for selecting a selected output from either said mode switch or from said mode register means, and for outputting said selected output to said apparatus as said mode selection signal; and second gate means for selecting one of said first and said second reset signals from said reset signal generating means and said pseudo signal generating means respectively and for outputting said selected first or second reset signal to said apparatus as said reset signal.

2. A mode selection circuit for supplying a mode selection signal and a reset signal to an apparatus having a plurality of operating modes each time an operating mode is selected, said mode selection circuit comprising:

a mode switch to which an operating mode is manually set;

mode register means for outputting data representing an operating mode designated by a software command;

a first AND gate receiving outputs from said mode switch and said mode register means and supplying an output to said apparatus as said mode selection signal;

first reset signal generating means for generating a first reset signal in accordance with one of a power switch and a reset switch;

second reset signal generating means for generating a second reset signal designated by said software command; and a second AND gate selecting one of the first and second reset signals and outputting said selected first or second reset signal to said apparatus as said reset signal.

3. A mode selection circuit according to claim 2, wherein said mode register means and said second reset signal generating means comprise timing means for generating a common timing signal in accordance with said software command, said timing means enabled to receive said software command in accordance with said reset signal output from said second AND gate.

* * * * *